US012771121B2

(12) United States Patent
Weidenbruch et al.

(10) Patent No.: US 12,771,121 B2
(45) Date of Patent: Oct. 20, 2026

(54) INTRINSICALLY SAFE AUTOMATION FIELD DEVICE

(71) Applicant: Endress+Hauser SE+Co. KG, Maulburg (DE)

(72) Inventors: Simon Weidenbruch, Lörrach (DE); Harald Schäuble, Lörrach (DE); Julian Bockstaller, Schopfheim (DE)

(73) Assignee: Endress+Hauser SE+Co. KG, Maulburg (DE)

(*) Notice: Subject to any disclaimer, the term of this patent is extended or adjusted under 35 U.S.C. 154(b) by 246 days.

(21) Appl. No.: 18/700,601

(22) PCT Filed: Sep. 27, 2022

(86) PCT No.: PCT/EP2022/076763

§ 371 (c)(1),
(2) Date: Apr. 11, 2024

(87) PCT Pub. No.: WO2023/066618

PCT Pub. Date: Apr. 27, 2023

(65) Prior Publication Data

US 2025/0141216 A1 May 1, 2025

(30) Foreign Application Priority Data

Oct. 21, 2021 (DE) ..................... 10 2021 127 431.1

(51) Int. Cl.
*H02H 9/00* (2006.01)

(52) U.S. Cl.
CPC .................................. *H02H 9/008* (2013.01)

(58) Field of Classification Search
CPC ..................................................... H02H 9/008
See application file for complete search history.

(56) References Cited

U.S. PATENT DOCUMENTS 3,818,273 A * 6/1974 Nakashima ............ H02H 9/008 361/100
5,179,488 A * 1/1993 Rovner ................ H02H 11/002 361/84

(Continued)

FOREIGN PATENT DOCUMENTS

DE 69721478 T2 4/2004
DE 202009001186 U1 5/2009

(Continued)

OTHER PUBLICATIONS

DIN EN 60079-11 [online] Explosive Atmospheres / Part 11: Equipment Protection by Intrinsic Safety, 2012 [retrieved on Feb. 12, 2026] Retrieved from the internet: <URL: https://www.vde-verlag.de/standards/0170111/din-en-60079-11-vde-0170-7-2012-06.html> (Year: 2012).*

(Continued)

*Primary Examiner* — Crystal L Hammond
*Assistant Examiner* — Samantha L Faubert
(74) *Attorney, Agent, or Firm* — Mark A. Logan; Endress+Hauser (USA) Holding, Inc.

(57) ABSTRACT

An intrinsically safe field device of automation technology for use in an explosion-hazard area comprises two connection terminals for connecting a two-wire line; a sensor and/or actuator element for detecting and/or setting a process variable; and a field device electronic system that is connected to the first and second connection terminal and conducts a current supplied via the two-wire line via a current path. The field device electronic system is designed to transmit process variables detected via the sensor element via the two-wire line and/or receive a process variable to be set by the actuator element via the two-wire line The field device electronic system has a shunt resistor circuit with a shunt resistor and two diodes connected in parallel to the shunt resistor. The diodes are in the current path in the flow direction.

6 Claims, 2 Drawing Sheets

(56) References Cited

U.S. PATENT DOCUMENTS

| | | | | |
|---|---|---|---|---|
| 5,793,589 | A * | 8/1998 | Friedl | H02H 3/445 307/131 |
| 8,976,498 | B2 * | 3/2015 | Fiedler | G06F 1/30 320/132 |
| 11,349,297 | B2 * | 5/2022 | Telefus | H02H 1/0015 |
| 11,956,093 | B2 * | 4/2024 | Schäuble | G05B 19/0423 |
| 2009/0312970 | A1 | 12/2009 | Kalenine | |
| 2016/0141955 | A1 * | 5/2016 | Seifried | H02M 3/156 323/282 |

FOREIGN PATENT DOCUMENTS

| | | | |
|---|---|---|---|
| DE | 102017102678 | A1 | 8/2018 |
| DE | 102020105605 | A1 | 9/2021 |

OTHER PUBLICATIONS

Explosive atmospheres—Part 11: Equipment protection by instrinsic saftey“i”, (IEC 60079-11:2011 Cor.:2012); German version EN 60079-11:2012, 156 pp.

Industrial communication networks—Fieldbus specifications—Part 2: Physical layer specification and service definition, Committee Draft (CD), 65C/1028/CD, Project No. IEC 61158-2 ED7, IEC Sc 65C: Industrial Networks, Jun. 5, 2020, 106 pp.

* cited by examiner

INTRINSICALLY SAFE AUTOMATION FIELD DEVICE

CROSS-REFERENCE TO RELATED APPLICATIONS

The present application is related to and claims the priority benefit of DPMA Patent Application No. 10 2021 127 431.1, filed on Oct. 21, 2021, and International Patent Application No. PCT/EP2022/076763, filed Sep. 27, 2022, the entire contents of which are incorporated herein by reference.

TECHNICAL FIELD

The invention relates to an intrinsically safe automation field device for use in an explosion-hazard area.

BACKGROUND

In automation, field devices serving to record and/or modify process variables are frequently used, particularly in process automation. Sensors, such as fill-level measuring devices, flow meters, pressure and temperature measuring devices, pH redox potential meters, conductivity meters etc., are used for recording the respective process variables, such as fill level, flow, pressure, temperature, pH level, and conductivity. Actuators, such as, for example, valves or pumps, are used to influence process variables. The flow rate of a fluid in a pipeline section or a fill-level in a container can thus be altered by means of actuators. In principle, all devices that are used in-process and that supply or process process-relevant information are referred to as field devices. In the context of the invention, field devices also include remote I/Os, radio adapters, and/or, in general, devices that are arranged at the field level.

A variety of such field devices is manufactured and marketed by the Endress+Hauser company.

Many field devices are available in so-called 2-wire versions (two-wire field device). Power is here supplied to the field device by means of the same pair of lines (two-wire line) used for communication.

Two-wire field devices are designed in such a way that the measured value is communicated, i.e., transmitted, in an analog manner via the two-wire wiring or the two-wire line. The transmission is usually based on the 4 to 20 mA standard. In addition, there is also a plurality of bus-fed field devices in existing automation systems which are connected to one another and to at least one higher-level unit via a field bus, which is standard in automation technology.

The bus-fed field devices known from the prior art are designed in such a way that the measured value is communicated digitally via the fieldbus. For example, the field devices can communicate data in accordance with the Profibus standard, in particular Profibus PA/FF.

Especially in the process industry, but also in automation, physical or technical variables must often be measured or determined by the field devices in areas in which there is potentially a risk of explosion, so-called potentially explosive areas. By means of suitable measures in the field devices and evaluation systems (e.g. voltage and current limitation), the electrical power in the signal to be transmitted can be limited such that this signal cannot trigger an explosion under any circumstances (short-circuit, interruptions, thermal effects, etc.). For this purpose, corresponding protection principles have been defined in IEC EN DIN 60079 ff.

In accordance with this standard, design and circuitry measures for the field devices for use in explosion-hazard areas are defined on the basis of the ignition protection types to be applied. One of these ignition protection types represents the ignition protection type "intrinsic safety" (identification code Ex-i, IEC EN DIN 60079-11, published June 2012).

The ignition protection type "intrinsic safety" is based on the principle of limiting current and voltage in a circuit. The power in the circuit which could be capable of igniting an explosive atmosphere is limited such that the surrounding explosive atmosphere cannot be ignited either by sparks or by impermissible heating of the electrical components.

The ignition protection type "intrinsic safety" defines three protection levels: Ex-ia, Ex-ib and Ex-ic. In this case, the highest level is defined by level a, at which two countable faults in their combination do not lead to a malfunction and thus cause ignition (2-fault safety). Level b defines that one countable fault does not lead to a malfunction and thus cause an ignition (1-fault safety). In the case of level c, no error safety is defined, so that, in the case of one malfunction, an ignition can already be triggered (0-fault safety).

A critical area with regard to the intrinsic safety ignition protection type (Ex-i) in field devices is the shunt resistor, which is used to measure or read back the loop current. In normal operation, only a few mV usually drop across the shunt resistor. This voltage is used as feedback for regulating the input current of the device and in some cases as an input value for digital communication (HART, Profibus PA, or Foundation Fieldbus FF). The devices form a controllable current sink, wherein the current can simultaneously be an analog current interface (4-20 mA current interface), or a digital bus signal can be modulated to this loop current (HART or Manchester-bus-powered as in the case of Profibus PA or Foundation Fieldbus).

If the shunt resistor then becomes high-resistance in the event of a fault or breaks off from the circuit board, the entire terminal voltage of the device is applied at the point of the resistor.

For intrinsically safe devices in accordance with the aforementioned standard IEC EN DIN 60079-11 (Ex-i), these shunt resistors therefore must either have a sufficient distance (separation distance in accordance with Table 5 of the standard IEC EN DIN 60079-11) from the rest of the field device electronic system or be designed with triple redundancy in order to prevent an unsafe state (impermissibly high voltage) of the field device from occurring in the event of a fault.

However, a redundant design of the resistors may not be possible under certain circumstances if inductances are necessary in series with the shunt resistor. This is often the case with Manchester-bus-powered field devices, such as Profibus PA and Foundation Fieldbus FF field devices. In this case, the only option is thus to ensure a sufficient isolation of the shunt resistor from the rest of the device electronics by means of correspondingly designed separation distances (Table 5 of the standard IEC EN DIN 60079-11).

However, this measure requires a relatively large amount of space on the corresponding printed circuit board, because additional space must be provided for the separation distances. Furthermore, shunt resistors are generally designed as precision resistors and are thus relatively expensive.

SUMMARY

The object of the invention is therefore to provide an intrinsically safe automation technology with a field device electronic system which can be realized more cost-effectively and which requires even less space on a printed circuit board.

The object is achieved by the intrinsically safe automation field device according to the present disclosure.

The intrinsically safe automation field device according to the invention for use in an explosion-hazard area comprises:

a first and a second connection terminal for connecting a two-wire line via which a current can be supplied;

a sensor and/or actuator element for capturing and/or setting a process variable;

a field device electronic system that is connected to the first and second connection terminals and conducts the current, which can be supplied via the two-wire line, from the first to the second connection terminal via a current path, wherein the field device electronic system is designed to transmit the process variable detected via the sensor element, in particular by setting the current to a corresponding value, via the two-wire line, and/or to receive a process variable to be set by the actuator element, in particular by reading out the current, via the two-wire line, and/or to correspondingly set the actuator element, wherein the field device electronic system has a shunt resistor circuit with a shunt resistor, which is introduced into the current path, and two diodes, each of which is connected in parallel to the shunt resistor, said diodes being wired such that the diodes are introduced into the current path in the flow direction.

According to the invention, it is proposed that two diodes which are connected in parallel to the shunt resistor in the flow direction limit the voltage at the shunt resistor in the event of a fault, so that the requirements of the IEC EN DIN 60079-11 standard are met. The solution according to the invention offers the advantage that it can be realized in a more space-saving manner and is more cost-effective than a comparable solution from the prior art.

An advantageous embodiment of the intrinsically safe automation field device provides that the shunt resistor has a resistance value in the range of 5-40 ohms, preferably 7-30 ohms, particularly preferably in the range of 10-25 ohms.

Another advantageous embodiment of the intrinsically safe field device of automation technology provides that the diodes are silicon diodes at a forward voltage of approximately 0.6 to 0.7 V.

A further advantageous embodiment of the intrinsically safe automation field device provides that the field device electronic system is configured to transmit a value corresponding to the process variable in accordance with the Profibus PA or Foundation Fieldbus FF standard and/or to receive a value corresponding to the process variable for setting the actuator element in accordance with the Profibus PA or Foundation Fieldbus FF standard. In particular, the embodiment can provide that the shunt resistor circuit further comprises an inductance connected in series to the shunt resistor for increasing the stability of a communication in accordance with the Profibus PA or Foundation Fieldbus FF standard, and wherein the diodes are connected in parallel to the shunt resistor and the inductance.

A further advantageous embodiment of the intrinsically safe automation field device provides that the field device electronic system has a bridge rectifier which is connected on the input side to the connection terminals and which is configured to rectify a terminal voltage applied to the input side and to provide it on the output side for supplying power to the field device electronic system.

BRIEF DESCRIPTION OF THE DRAWINGS

The present disclosure is explained in more detail on the basis of the following drawings.

In the figures.

DETAILED DESCRIPTION

Figure 1:
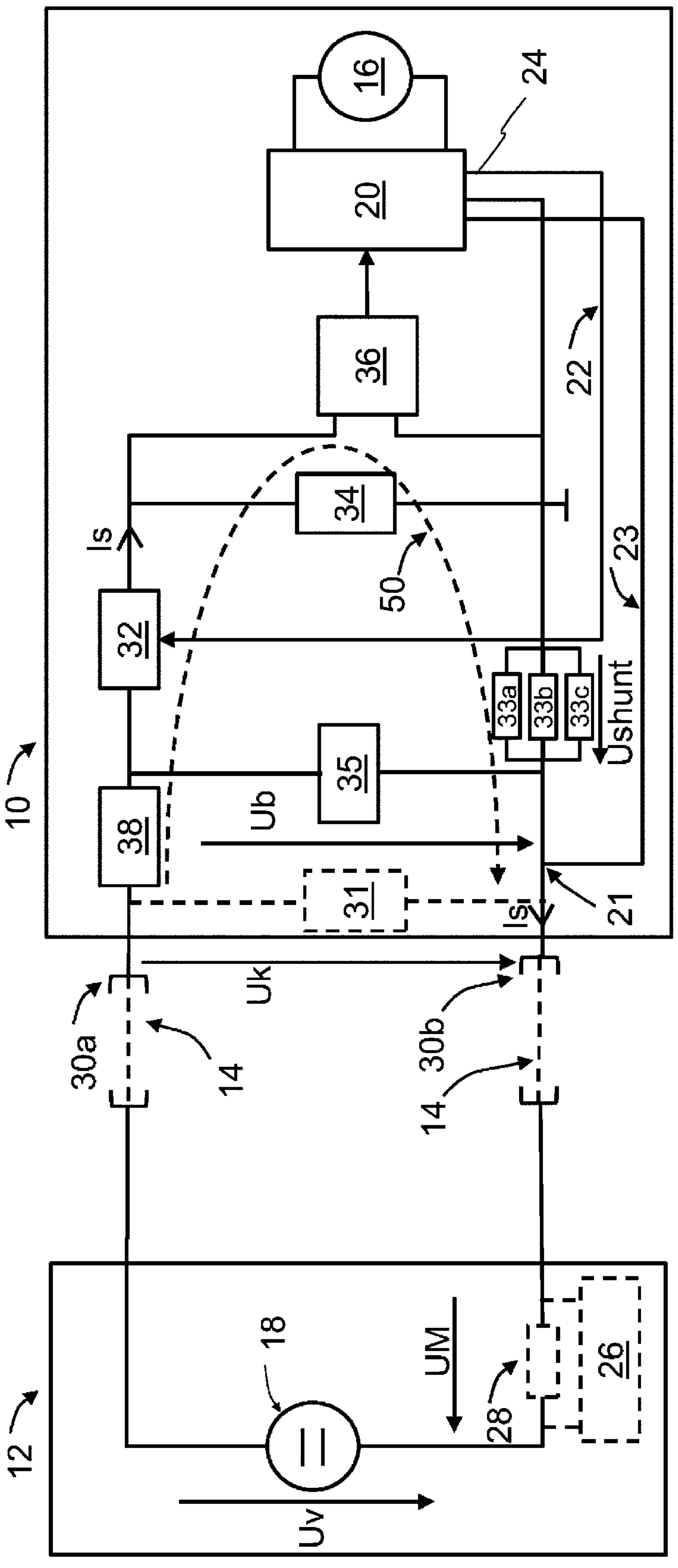
Fig. 1 (Prior Art)
FIG. 1 shows a schematic representation of a field device having a shunt resistor circuit known from the prior art.

FIG. 1 is a schematic representation of a field device 10, which is connected, via first and second connection terminals 30*a* and 30*b*, to a two-wire line 14 for signal and power transmission. The two-wire line 14 is in turn connected at the other end to a higher-level unit 12. In the example shown, the field device 10 is a measuring point in which a measured value or process variable (for example temperature, pressure, humidity, fill level, flow) is captured with the aid of a sensor 16. However, the field device could also be an actuator point in which a process variable is set with the aid of an actuator.

The field device 10 does not contain its own power source, but rather draws the supply current required for operation via the two-wire line 14. This can be provided, for example, by a voltage source 18 contained in the higher-level unit 12. A measured value signal representing the measured value just measured is transmitted from the field device 10 to the higher-level unit 12 via the same two-wire line 14.

Depending on the form of the field device 10, the measured value transmission can take place in an analog or digital manner via the two-wire line 14 to the higher-level unit.

In accordance with a conventional technique, the analog measured value transmission is based on a signal current Is flowing via the two-wire line 14, which can change between two prespecified values (usually, the current values, 4 mA and 20 mA), being set corresponding to the measured value.

For measured value acquisition, the field device 10 in turn contains the already mentioned sensor 16 and a measuring transducer circuit 20 connected thereto which drives a controllable current regulation 32 via a control line 22 in such a way that the measurement current Is is set to a detected value (signal current) that represents the captured measured value.

By means of internal field device electronics, the signal current Is is guided in the field device 10 by a current path 50 from the first to the second connection terminal 30*a*, 30*b*. The current Is can be set via a controllable current regulator, incorporated into the current path 50, or current sink 32. The current regulator is correspondingly controlled by a signal output by the measuring transducer circuit 20 at the output, which signal is supplied as a control signal to the current regulator 32 via the control line 22. Depending on the measured value detected in each case, the signal current Is flowing in the two-wire line is set by a corresponding control of the current regulator or current sink 32. The current regulator or current sink can comprise, for example, a transistor, which is regulated by the control signal from the measuring transducer circuit 20. In the case where the field device is designed as an actuator, i.e., has an actuator instead of a sensor, the current regulator is omitted. If the measured value detected by the sensor 16 is at the lower end of the measured value range, the signal current Is will also assume the lower value of the signal current range. In the usual 4-20 mA technology, therefore, a value of 4 mA. Correspondingly, if the measured value detected by the sensor 16 is at the upper end of the measured value range, the signal current Is will assume the upper value of the signal current range. In the standard 4-20 mA technology, therefore, a value of 20 mA.

During the analog measured value transmission, the higher-level unit 12 comprises an evaluation circuit 26, which obtains the measured value information from the signal current Is transmitted via the two-wire line 14. For this purpose, a measuring resistor 28 is inserted into the two-wire line, at which a voltage UM is generated, which is proportional to the signal current Is transmitted via the two-wire line and which is supplied to the evaluation circuit 26. The voltage source 18 supplies a DC voltage Uv, and the measuring current Is is a direct current.

In addition to the analog measured value transmission, however, the field device 10 can also be designed for digital measured value transmission via the two-wire line, for example in accordance with the Profibus standard PA or in accordance with the Foundation Fieldbus standard FF.

In this case, the current regulation or current sink 32 is set by a signal emitted by the measuring transducer circuit 20 at the output, which signal is supplied via the control line 22 as a control signal of the current regulation 32, to a fixed/unchangeable basic current value Is in the range from 10 to 40 mA, usually approximately 12 mA, to which a digital current signal corresponding to the measured value is then modulated (Manchester coding without an average value, with a current/amplitude modulation of Is ±9 mA).

In the event that the measured value transmission takes place digitally, the higher-level unit comprises a segment coupler, which is configured to convert the digital Profibus PA signal and to supply the Profibus PA field device with power.

In the event that the field device is designed as a Profibus PA field device, it must furthermore have a polarity reversal protection 31, whereas in the event that the field device is designed as a two-wire field device or as a FF field device, it can optionally have a polarity reversal protection device. The polarity reversal protection device can be realized in the form of a bridge rectifier circuit 31. The bridge rectifier circuit 31 is designed in such a way that the terminal voltage Uk applied to the connection terminals is applied on the input side, and a polarity-independent operating voltage Ub is set on the output side.

Irrespective of whether the field device 10 is designed for analog or digital measured value transmission, the field device further comprises a low-resistance shunt resistor circuit 33*a*, 33*b*, 33*c*, via which the set signal current Is is read back by the measuring transducer circuit 20 by means of a read-back line 23. In order to satisfy the requirements mentioned at the outset for intrinsic safety (Ex-ia) of the field device, at least in the case of field devices having analog measured value transmission, the shunt resistor, as shown in FIG. 1, is designed to have three-fold redundancy. Shunt resistors 33*a*, 33*b*, 33*c* of this type are indispensable for regulating the current signal, corresponding to a measured value determined by the sensor for a field device, and typically have a total resistance value in the range of 5-40 ohms, preferably 7-30 ohms, particularly preferably in the range of 10-25 ohms. According to Ohm's law, a voltage U_Shunt=R_Shunt_gesamt. Is drops across the shunt resistor circuit 33*a*, 33*b*, 33*c*. The voltage U_shunt is thus proportional to the current Is flowing through the field device. In order to regulate the signal current Is, the voltage dropping across the shunt resistor circuit 33*a*, 33*b*, 33*c* is supplied to the measuring transducer circuit.

However, a redundant design of the shunt resistor is not always possible, for example it is not possible if an inductance is necessary, for example for increasing the stability of digital communication, when in series with the shunt resistor. In this case, the shunt resistor circuit is designed with a single resistor and is spaced apart from the other electronic components of the field device electronic system in accordance with the specifications from the 60079-11 standard, Table 5.

Moreover, the field device 10 further contains a voltage regulator 36, e.g., in the form of a switching or linear regulator, the task of which consists in generating as constant an operating voltage as possible for the measuring transducer circuit 20 and the sensor 16. The input voltage for the voltage regulator 36 can be provided, for example, by a voltage source 34, in particular in the form of a capacitor. The voltage source 34 supports the input voltage or terminal voltage Uk, which is provided by the voltage source 18 contained in the higher-level unit 12. The voltage source 34 thus serves as a "source" for the circuit parts connected to it, in particular for the voltage regulator 36.

The use of the voltage regulator 36 in conjunction with the voltage source 34 makes it possible to provide the transducer circuit 20 and the sensor 16 at all times with the highest possible power. The voltage regulator 36 ensures that, despite an increase in its input voltage Ue, the operating voltage of the transducer circuit 20 and the sensor 16 is kept at a constant value, so that a higher input power is available by increasing the input voltage Ue at the voltage regulator 36, which thus also enables a higher output power.

For voltage limitation, the field device 10 can have a voltage limiting circuit 35 as part of the explosion protection unit 35, 38. The voltage limiting circuit 35 is connected in parallel to the external voltage source 18 between the first and second connection terminals 30*a*, 30*b*.

Alternatively or additionally, the field device can have a current-limiting circuit 38 for current limitation as part of the explosion protection unit. The current-limiting circuit is connected in series to the connection terminals 30*a*, 30*b* or the voltage-limiting circuit 35.

According to the prior art, the voltage limiting circuit 35 can be formed, for example, from three diodes, in particular Z-diodes, that are connected in parallel to one another (in order to ensure a 2-fault safety). The diodes are arranged in such a way that voltages which can be induced by inductances underlying them in terms of the circuitry and/or voltages which can be unintentionally generated by other circuit parts underlying them in terms of circuitry are limited to the connection terminals 30*a*, 30*b*. In the embodiment shown in FIG. 1, the diodes are connected in such a way that the cathodes are each connected to the connection terminal 30*a* and the anodes are each connected to the connection terminal 30*b*.

According to the prior art, the current-limiting circuit 38 can also be formed, for example, from three diodes connected in series, in particular Shottky diodes. The diodes are arranged in such a way that an undesired current flow from the field device electronic system via the connection terminals 30*a*, 30*b* is prevented. In the embodiment shown in FIG. 1, the diodes connected in series are interconnected in such a way that the anodes are each directed toward the connection terminal 30*a* and the cathodes are each directed away from the connection terminal 30*a*.

In order to be able to meet the requirements of the ignition protection type "intrinsic safety" and thus an intrinsically safe field device, the diodes according to the prior art must be arranged on a printed circuit board of the field device electronic system in such a way that the separation distances are met in accordance with Table 5 of the IEC EN DIN 60079-11 standard, published in June 2012.

Figure 2:
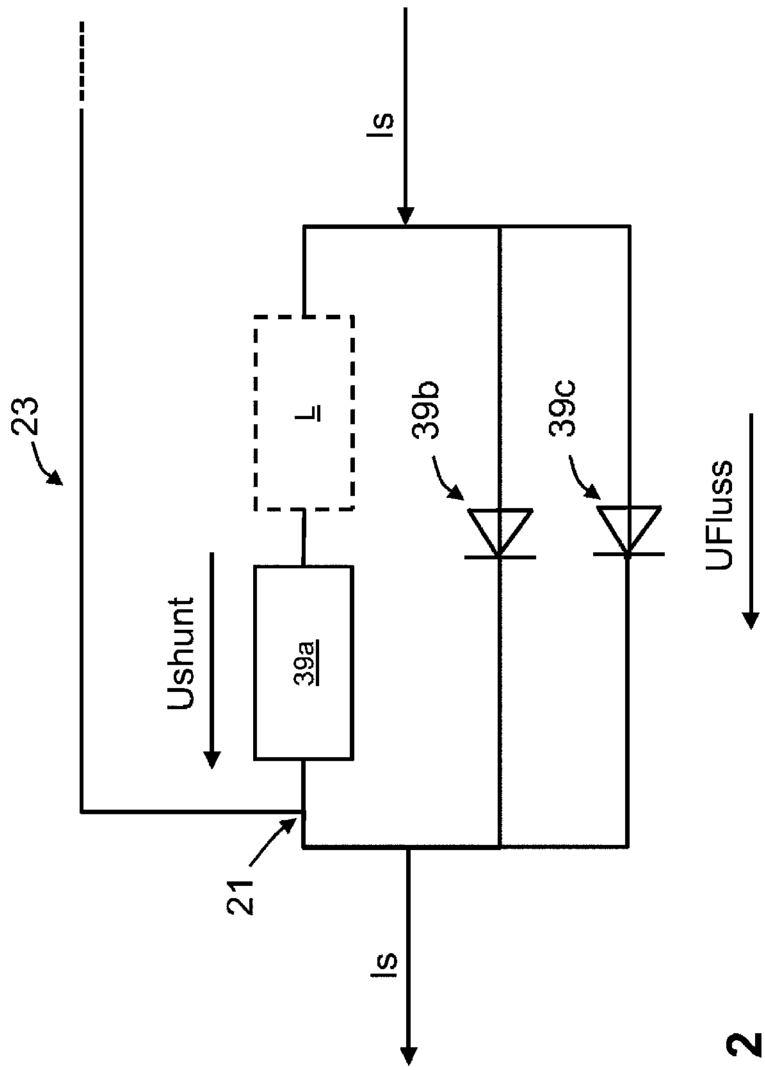
FIG. 2 shows an embodiment according to the invention of the shunt resistor circuit.

FIG. 2 shows an embodiment of the shunt resistor circuit 39*a*, 39*b*, 39*c* according to the invention. This comprises a (single) shunt resistor 39*a* and two diodes 39*b*, 39*c*, in particular two silicon diodes which are connected in parallel to the shunt resistor 39*a*. The diodes 39*b*, 39*c* are wired in such a way that are connected for the signal current Is in the forward direction. In the example shown in FIG. 2, the cathodes are each directed toward the second connection terminal 30*b* and the anodes are each directed away from the second connection terminal 30*b*. The diodes 39*b*, 39*c* are advantageously designed as SMD (surface mounted device) components. Optionally, the shunt resistor circuit 39*a*, 39*b*, 39*c* can also have an inductance L connected in series with the shunt resistor 39*a*, which inductance serves to increase the stability of a communication. This is necessary, for example, if the field device is configured to transmit and/or receive the process variable in accordance with the Profibus PA or the Foundation Fieldbus FF standard. The (single) shunt resistor 39*a* has a resistance value in the range of 5-40 ohms, preferably 7-30 ohms, particularly preferably in the range of 10-25 ohms. In normal operation (error-free operation), a shunt voltage UShunt of only a few mV thus drops across the shunt resistor 39*a*. This shunt voltage UShunt is significantly smaller than a flow voltage, Uflow dropping across the diodes during normal operation, which is typically approximately 0.6 to 0.7 V in the case of silicon diodes. Therefore, the voltage tapped at the voltage tapping point 21, which is transmitted by means of the read-back line 23 to the measuring transducer circuit 20 and through which the set signal current Is is read back, is not distorted by the diodes 39*b*, 39*c* connected in parallel. Diodes which have a small current in the forward direction are preferably selected to minimize a distortion of the current read back by means of the shunt resistor circuit.

This means that different diodes can be used depending on the form of the field device. In the event that the field device is designed as a Profibus PA field device, diodes can be used which have a higher current in the forward direction than in the case where the field device is designed for analog measured value transmission. For example, in a PA field device, diodes can be used which, in the corresponding operating voltage range type 40 mV-400 mV, have a current in the forward direction of less than or equal to 1 mA ($I_D \leq 1$ mA), preferably less than or equal to 0.8 mA ($I_D \leq 0.8$ mA), particularly preferably less than or equal to 0.7 mA ($I_D \leq 0.7$ mA). In the case where the field device is designed for analog measured value transmission, diodes can be used, for example, which, in the corresponding operating voltage range type 40 mV-400 mV, have a current in the forward direction of less than or equal to 100 μA ($I_D \leq 100$ μA), preferably less than or equal to 50 μA ($I_D \leq 50$ μA), particularly preferably less than or equal to 10 μA ($I_D \leq 10$ μA).

If the shunt resistor 39*a* is now high-resistance or breaks away from the circuit board in the event of a fault, the voltage dropping across the shunt resistor circuit is limited by the diodes 39*b*, 39*c* to the forward voltage of the diodes, i.e., for example, 0.6 to 0.7 V when silicon diodes are used. In this respect, a separation distance specified in accordance with the IEC EN DIN 60079-11 standard, Table 5 can be reduced to a minimum.

The invention claimed is:

1. An intrinsically safe field device of automation technology for use in an explosion-hazard area, comprising:

a first and a second connection terminal for connecting a two-wire line via which a current can be supplied;

a sensor and/or actuator element for detecting and/or setting a process variable; and a field device electronic system that is connected to the first and second connection terminals and conducts the current, which can be supplied via the two-wire line, from the first to the second connection terminal via a current path, wherein the field device electronic system is designed to transmit process variables detected via the sensor element via the two-wire line and/or to receive a process variable to be set by the actuator element via the two-wire line, and/or to correspondingly set the actuator element, and wherein the field device electronic system includes:

a low-resistance shunt resistor circuit with a shunt resistor and two diodes, wherein each of the two diodes is connected in parallel to the shunt resistor and wherein the diodes are wired into the current path in the flow direction; and a transducer circuit configured to read a voltage across the shunt resistor circuit via a voltage tap at the shunt resistor circuit.

2. The intrinsically safe automation field device according to claim 1, wherein the shunt resistor has a resistance value in the range of 5-40 ohms.

3. The intrinsically safe automation field device according to claim 1, wherein the two diodes are silicon diodes having a forward voltage of approximately 0.6 to 0.7 V.

4. The intrinsically safe automation field device according to claim 1, wherein the field device electronics are configured to transmit a value corresponding to the process variable according to the Profibus PA or Foundation Fieldbus FF standard and/or to receive a value corresponding to the process variable for setting the actuator element according to the Profibus PA or Foundation Fieldbus FF standard.

5. The intrinsically safe automation field device according to claim 4, wherein the shunt resistor circuit further has an inductance connected in series to the shunt resistor for increasing the stability of a communication according to the Profibus PA or Foundation Fieldbus FF standard, and wherein the diodes are connected in parallel to the shunt resistor and the inductance.

6. The intrinsically safe automation field device according to claim 1, wherein the field device electronic system has a bridge rectifier which is connected on the input side to the connection terminals and which is designed to rectify a terminal voltage applied to the input side and to provide the rectified terminal voltage on the output side for supplying power to the field device electronic system.

* * * * *